(No Model.)
G. W. COOK.
UNDERGROUND CONDUIT FOR ELECTRICAL CONDUCTORS.
No. 374,348. Patented Dec. 6, 1887.
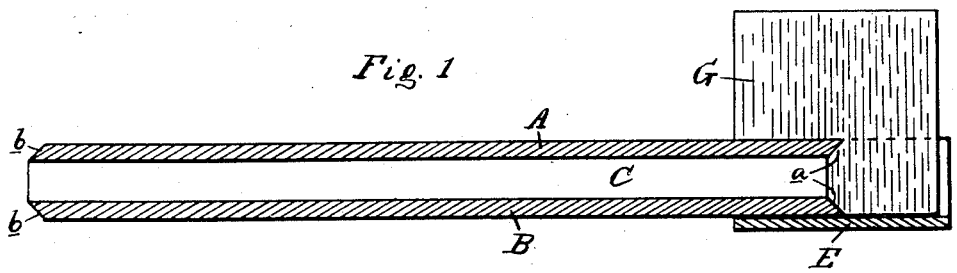
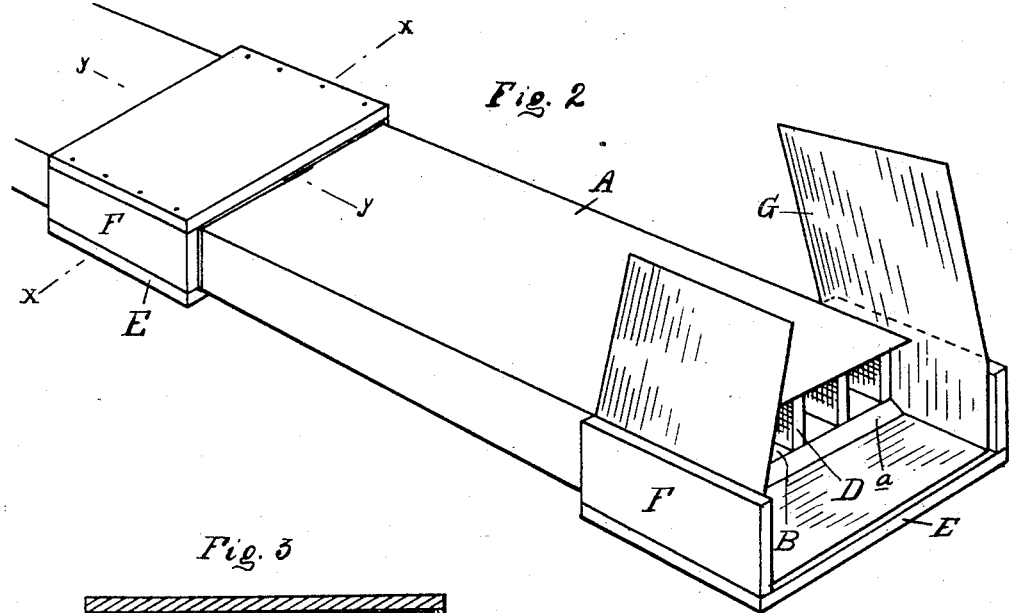
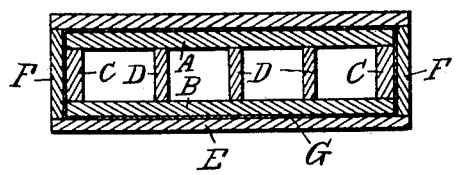
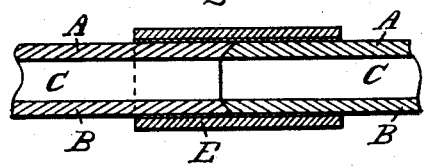
Witnesses:
P. M. Hulbert
Inventor:
George W. Cook
By Thos. A. Sprague & Son
Atty.

UNITED STATES PATENT OFFICE.

GEORGE W. COOK, OF DETROIT, MICHIGAN, ASSIGNOR OF ONE-HALF TO CHARLES B. COLE, OF SAME PLACE.

UNDERGROUND CONDUIT FOR ELECTRICAL CONDUCTORS.

SPECIFICATION forming part of Letters Patent No. 374,348, dated December 6, 1887.

Application filed September 24, 1887. Serial No. 250,609. (No model.)

*To all whom it may concern:*

Be it known that I, GEORGE W. COOK, a citizen of the United States, residing at Detroit, in the county of Wayne and State of Michigan, have invented certain new and useful Improvements in Underground Conduits for Electrical Conductors, of which the following is a specification, reference being had therein to the accompanying drawings.

This invention relates to new and useful improvements in underground conduits for electrical conductors; and the invention consists in the peculiar arrangement and construction of the parts, whereby the conduit is adapted to thoroughly insulate and protect the electrical conductors underground, and which at the same time reduces to a minimum the expense incurred by the use of other constructions known to the present state of the art.

In the drawings which accompany this specification, Figure 1 shows a vertical central longitudinal section of my underground conduit. Fig. 2 shows a perspective view of the same. Fig. 3 is a cross-section on line $x$ $x$ in Fig. 2. Fig. 4 is a cross-section on the line $y$ $y$ in Fig. 2.

My underground conduit consists of a series of like open-ended sections, substantially rectangular in cross-section, which are constructed as follows:

A is the top, B is the bottom, and C are the sides, of the rectangular box, constructed of boards, and which are saturated on the outside with a wood-preservative—such as tar or asphaltum—or are otherwise subjected to means for preserving the wood. This box I divide by partitions D into a series of compartments to receive and separate from each other the different electrical conductors which the conduit is intended to receive. The whole interior of the box and all the partitions are coated with shellac to enhance insulation, exclude dampness and moisture, and prevent induction, and to form at the same time a slippery passage through which the conductors may be drawn without causing abrasion and consequent damage to the conductors. The ends of the top and bottom are correspondingly chamfered, as shown, whereby one end of the box forms projecting inclined shoulders $a$, and the other ends form retreating inclined shoulders $b$, all so arranged that when the opposite ends of two sections are made to abut against each other an interlocking joint is formed.

To one end of the sections or box thus constructed I secure the bottom and sides E F of the inclosing box, half of the length of which is made to project over that end of the section, and between this inclosing box and the ends of the section I interpose a sheet of impervious felt paper, or other like material, of suitable length to fold or lap over the top of the box.

In practice the sections, being thus constructed, are joined in the following manner: Before the opposite ends of the two sections are joined, all the parts which form the joint are previously provided with a doping or coat of tar, asphaltum, or other similar material, and then, after the ends of the section are joined, another suitable coat is applied on top, after which the ends G of the paper are folded over the top, then another coat applied on top of the paper, after which the top of the box, heretofore disconnected, is nailed down upon the paper. After doping over all the exposed seams and joints, the joint is then completed, and the operation may be proceeded with on the next section.

Sections made after my plan may be of considerable length, and thus the work of laying the conduit made more expeditious than with the short lengths in use with other conduits. There being no ledges or joints formed in the inner side, all the compartments are perfectly smooth and in the best condition to have the conductors drawn through them without any damage usually caused by joints cemented together in the ordinary way, and where the cement is liable to intrude itself into the interior and harden there. With the paper wrapped over the joint in my construction there is no such difficulty. With the joint thus formed between two sections, if any care is exercised, there is no possibility of any water finding its way to the inside.

In practice, as the work is progressing, the tightness of the conduit may be tested in the usual manner by means of compressed air.

What I claim as my invention is—

1. In an underground conduit for electrical conductors, an open-ended conduit-section consisting of a rectangular box composed of top, bottom, and sides, the ends of the top and bottom being chamfered to form projecting inclined shoulders on one end and corresponding retreating shoulders on the other end, of longitudinal partition-strips dividing the box into compartments, and of a joint-box the bottom and sides of which are secured to one end thereof and extending one-half of their length beyond this end, and an impervious sheet of felt paper or like material secured between the joint-box and the end of each section, substantially as described.

2. In an underground conduit for electrical conductors, the combination of a series of like sections, each consisting of an open-ended box provided with longitudinal partitions and having the ends chamfered to form projecting inclined shoulders on one end and retreating shoulders upon the other end, of a sheet of felt paper or like material covering the joints between two such sections on the outside, and of an inclosing box around the joint between two sections, all constructed and arranged substantially as and for the purpose described.

In testimony whereof I affix my signature, in presence of two witnesses, this 13th day of September, 1887.

GEORGE W. COOK.

Witnesses:
JAS. WHITTEMORE,
ADOLPH BARTHEL.